United States Patent
Suga

(10) Patent No.: US 7,907,220 B2
(45) Date of Patent: Mar. 15, 2011

(54) TELEVISION BROADCASTING SYSTEM

(75) Inventor: Kazumi Suga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1421 days.

(21) Appl. No.: 10/339,287

(22) Filed: Jan. 10, 2003

(65) Prior Publication Data

US 2003/0137603 A1    Jul. 24, 2003

(30) Foreign Application Priority Data

Jan. 22, 2002  (JP) ................... 2002-012935
Jan. 22, 2002  (JP) ................... 2002-012936

(51) Int. Cl.
*H04N 5/50*  (2006.01)
*H04N 5/91*  (2006.01)

(52) U.S. Cl. ............. 348/731; 348/584; 386/46; 386/95; 386/123

(58) Field of Classification Search ............ 386/46, 386/98, 111, 69, 70, 83, 95, 124–126, 123; 725/87, 89, 91, 92, 97, 100, 101–104, 58, 725/133, 134, 141, 142, 153; 710/25, 45, 710/52; 348/731, 584, 598
See application file for complete search history.

(56) References Cited

U.S. PATENT DOCUMENTS

| | | | |
|---|---|---|---|
| 5,159,453 A * | 10/1992 | Dhein et al. ................. 348/598 |
| 5,440,334 A * | 8/1995 | Walters et al. ............... 725/92 |
| 5,710,970 A | 1/1998 | Walters et al. ............. 455/3.1 |
| 5,926,205 A | 7/1999 | Krause et al. ................. 348/7 |
| 6,363,440 B1 * | 3/2002 | Stepp et al. ................. 710/52 |
| 6,480,667 B1 * | 11/2002 | O'Connor ................... 386/83 |
| 6,588,015 B1 | 7/2003 | Eyer et al. ................... 725/89 |
| 7,003,213 B1 * | 2/2006 | Hasegawa ................... 386/83 |
| 7,158,577 B1 * | 1/2007 | Oshima ..................... 375/261 |
| 2002/0023269 A1 | 2/2002 | Negishi et al. .............. 725/92 |
| 2002/0064376 A1 * | 5/2002 | Fukushima ................. 386/98 |
| 2003/0005465 A1 * | 1/2003 | Connelly ................... 725/119 |
| 2003/0190144 A1 | 10/2003 | Kuno et al. ................. 386/68 |
| 2007/0077028 A1 * | 4/2007 | Bodkin et al. ............... 386/95 |

FOREIGN PATENT DOCUMENTS

| | | |
|---|---|---|
| JP | 7-264529 | 10/1995 |
| JP | 2001-359071 | 12/2001 |
| WO | WO 98/47289 | 10/1998 |
| WO | WO 99/37045 | 7/1999 |
| WO | WO 01/74069 | 10/2001 |

OTHER PUBLICATIONS

European Search Report dated Feb. 13, 2004 (Ref. No. 2894130). (Corresponding European Patent Application No. 03250350.0-2223).
ARIB (Association of Radio Industries and Businesses) STD-B10 Section II, Chapter 5, pp. 52 to 83 (undated).
ARIB, "Digital Broadcasting in Japan" (GSC#61RAST#9, Sapporo, Japan, Aug. 29 to Sep. 1, 2000), dated Aug. 4, 2000, pp. 1 to 7.
Izumi, SI/EPG For Digital Broadcasting Receiver, Mitsubishi Electric Corporation (undated).

* cited by examiner

*Primary Examiner* — Thai Tran
*Assistant Examiner* — Mishawn Dunn
(74) *Attorney, Agent, or Firm* — Fitzpatrick, Cella, Harper & Scinto

(57) ABSTRACT

A receiver for detecting a predetermined SD broadcast program transmitted at a high speed using an HD broadcast channel, storing the detected predetermined program in a storage, and reproducing a broadcast signal of the predetermined program stored in the storage at a speed faster than the normal reproduction speed.

2 Claims, 13 Drawing Sheets

FIG. 3

| TABLE | PID |
| --- | --- |
| PAT | 0x0000 |
| PMT | INDIRECT DESIGNATION WITH PAT |
| CAT | 0x0001 |
| NIT | 0x0010 |
| SDT | 0x0011 |
| BAT | 0x0011 |
| EIT | 0x0012 |
| RST | 0x0013 |
| TDT | 0x0014 |
| TOT | 0x0014 |
| PCAT | 0x0022 |
| ST | EXCLUDING 0x0000, 0x0001 AND 0x0014 |
| NULL PACKET | 0x1FFF |

FIG. 4

| DATA STRUCTURE | NUMBER OF BITS |
|---|---|
| NETWORK INFORMATION SECTION () { | |
|     TABLE ID | |
|     SECTION SYNTAX INDICATION | 8 |
|     BOOKING FOR FUTURE | 1 |
|     BOOKING | 1 |
|     SECTION LENGTH | 2 |
|     NETWORK ID | 12 |
|     BOOKING | 16 |
|     VERSION NUMBER | 2 |
|     CURRENT NEXT INDICATION | 5 |
|     SECTION NUMBER | 1 |
|     LAST SECTION NUMBER | 8 |
|     BOOKING FOR FUTURE | 8 |
|     NETWORK DESCRIPTOR LENGTH | 4 |
|     for (i=0; i<N; i++) { | 12 |
|         DESCRIPTOR | |
|     } | |
|     BOOKING FOR FUTURE | |
|     TRANSPORT STREAM LOOP LENGTH | 4 |
|     for (i=0; i<N; i++) { | 12 |
|         TRANSPORT STREAM ID | |
|         ORIGINAL NETWORK ID | 16 |
|         BOOKING FOR FUTURE | 16 |
|         TRANSPORT DESCRIPTOR LENGTH | 4 |
|         for (j=0; j<N; j++) { | 12 |
|             DESCRIPTOR | |
|         } | |
|     } | |
|     CRC_32 | |
| } | 32 |

FIG. 5

| DATA STRUCTURE | NUMBER OF BITS |
|---|---|
| SERVICE LIST DESCRIPTOR () { <br>    DESCRIPTOR TAG <br>    DESCRIPTOR LENGTH <br>    for (i=0; i<N; i++) { <br>        SERVICE ID <br>        SERVICE TYPE <br>    } <br>} | <br>8 <br>8 <br><br>16 <br>8 |

FIG. 6

| TYPE OF SERVICE FORM | MEANING |
|---|---|
| 0x00 | UNDEFINED |
| 0x01 | DIGITAL TV SERVICE |
| 0x02 | DIGITAL AUDIO SERVICE |
| 0x03-0x7F | UNDEFINED |
| 0x80-0xBF | DEFINITION BY ENTERPRISE |
| 0xC0 | DATA SERVICE |
| 0xC1-0xFF | UNDEFINED |

FIG. 7A

| CHANNEL | 100 | 101 | 102※ | 701 |
|---|---|---|---|---|
| 10:00 | ○○ TRAVELS IN THE WORLD | F1 GRAND PRIX FIFTH ROUND | F1 GRAND PRIX FIFTH ROUND | |
| 11:00 | | | CART THIRD ROUND | |
| | QUIZ △△ | | WRC FOURTH ROUND | |
| 12:00 | | | WGP FIFTH ROUND | |

FIG. 7B

| CHANNEL | 100 | 101 | 102※ | 702 |
|---|---|---|---|---|
| 10:00 | ○○ TRAVELS IN THE WORLD | F1 GRAND PRIX FIFTH ROUND | F1 GRAND PRIX FIFTH ROUND ※ | |
| 11:00 | | | EASY □□ TRIP | |
| | QUIZ △△ | | ○○ TRAVELS IN THE WORLD | |
| 12:00 | | | | |

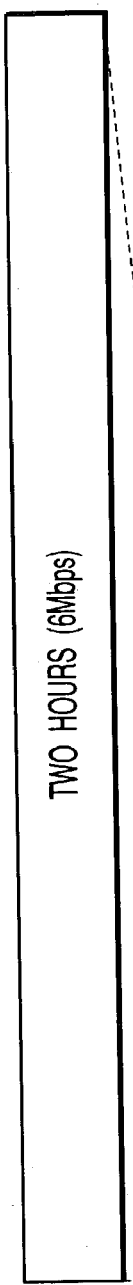
FIG. 8A
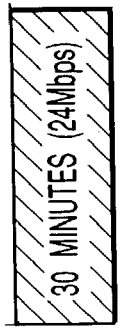
FIG. 8B
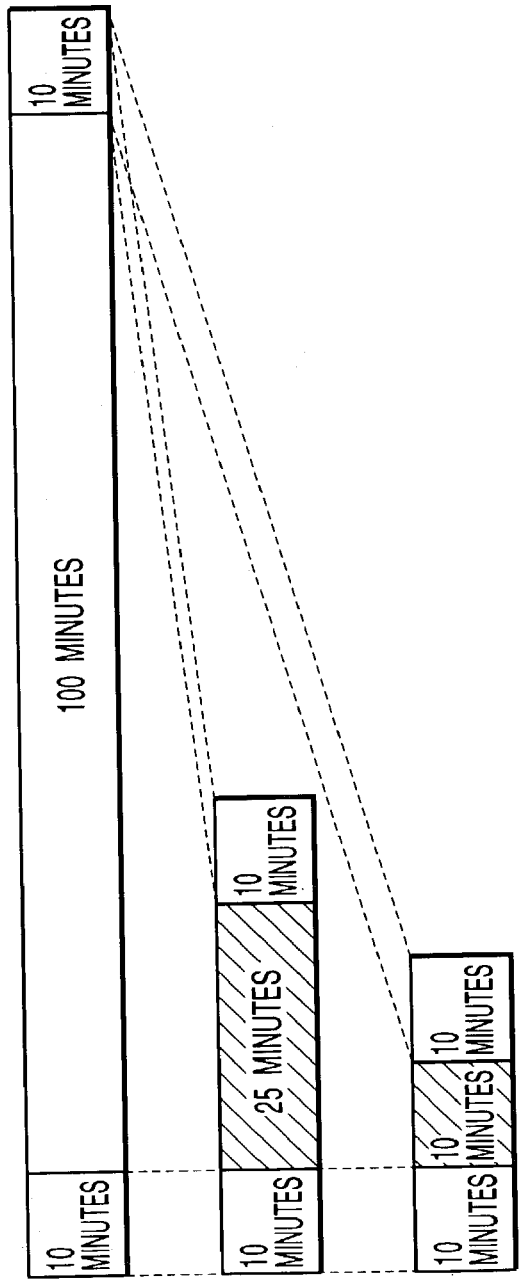
FIG. 8C
FIG. 8D
FIG. 8E

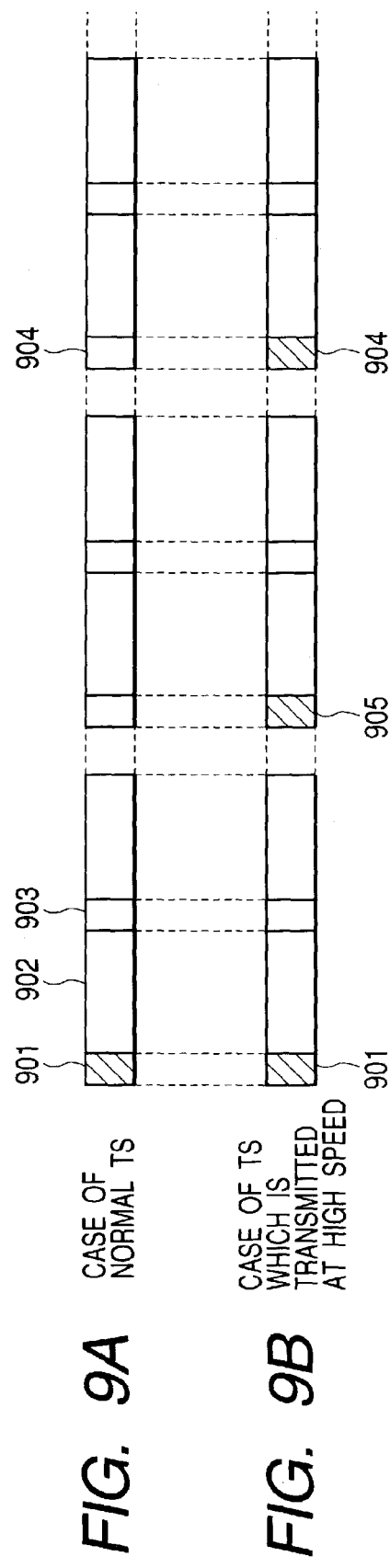

FIG. 10A

| CHANNEL | 100 | 101 | 102※ —1001 |
|---|---|---|---|
| 10:00 | ○○ TRAVELS IN THE WORLD | F1 GRAND PRIX FIFTH ROUND | F1 GRAND PRIX FIFTH ROUND |
| 11:00 | | | F1 GRAND PRIX FIFTH ROUND |
| | QUIZ △△ | | F1 GRAND PRIX FIFTH ROUND |
| 12:00 | | | F1 GRAND PRIX FIFTH ROUND |

FIG. 10B

| CHANNEL | 100 | 101 | 102 |
|---|---|---|---|
| 10:00 | ○○ TRAVELS IN THE WORLD | F1 GRAND PRIX FIFTH ROUND | F1 GRAND PRIX FIFTH ROUND ※ |
| 11:00 | | | F1 GRAND PRIX FIFTH ROUND ※ |
| | QUIZ △△ | | F1 GRAND PRIX FIFTH ROUND ※ |
| 12:00 | | | F1 GRAND PRIX FIFTH ROUND ※ |
| 13:00 | ○○ TRAVELS IN JAPAN | EASY □□ TRIP | NOON NEWS |

(1002 points to the four F1 GRAND PRIX FIFTH ROUND ※ entries)

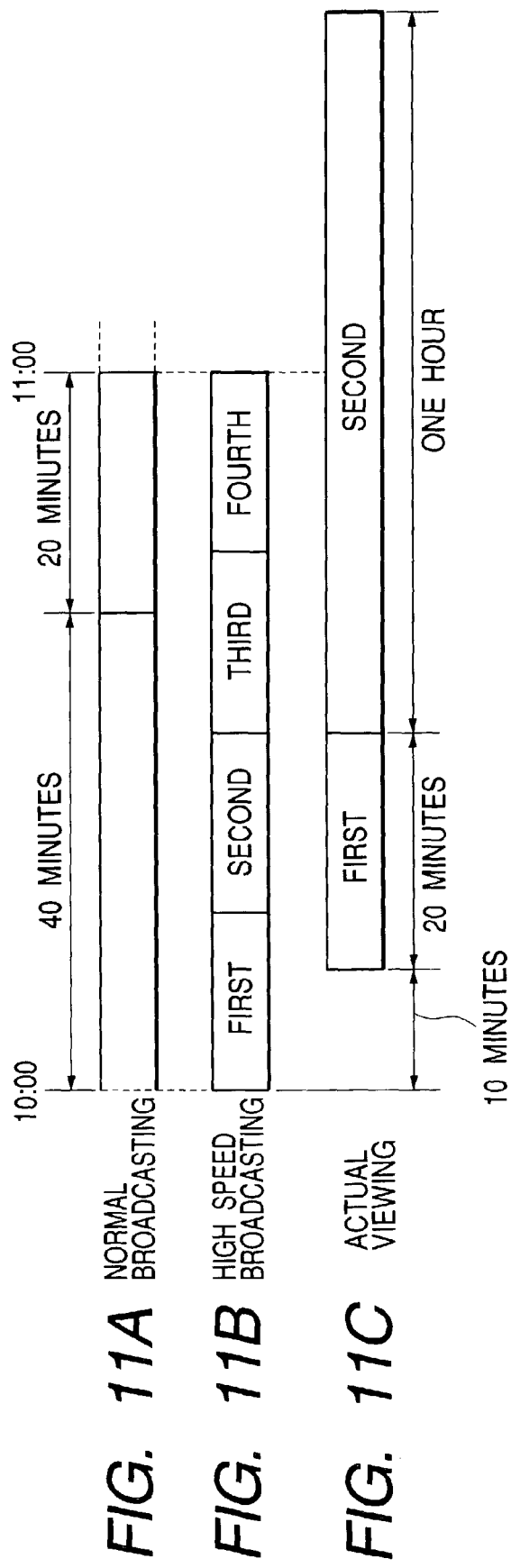

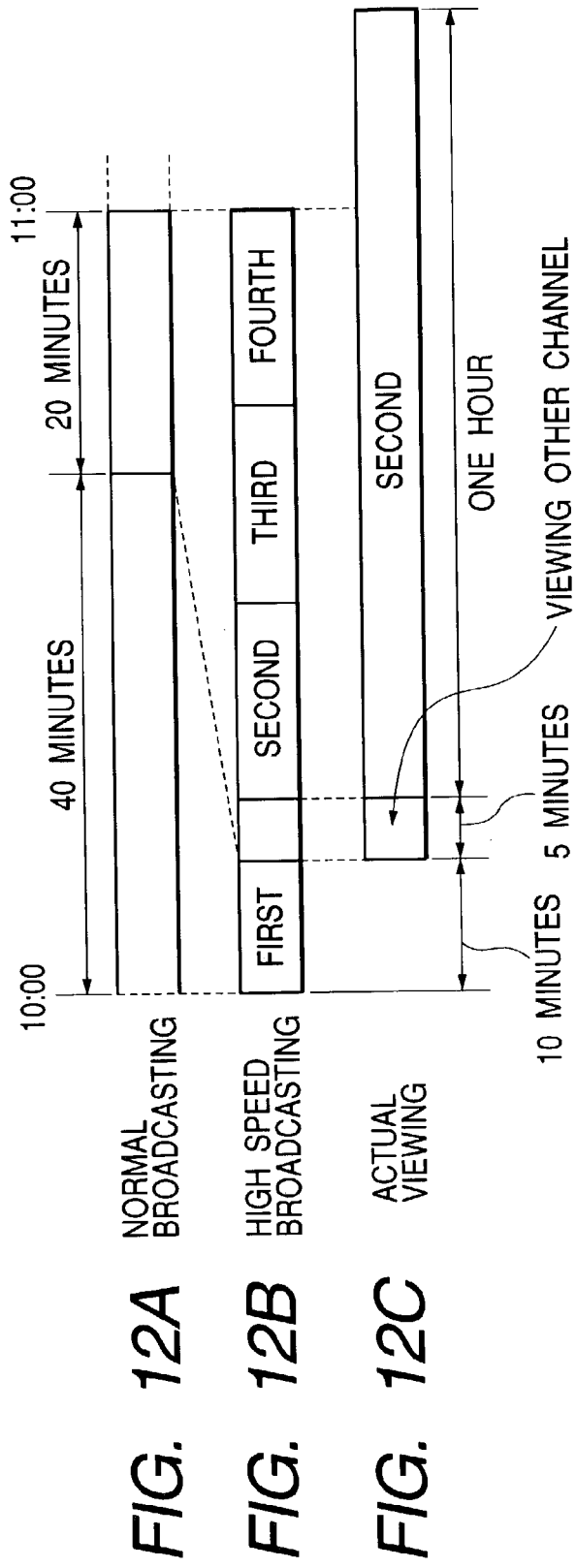

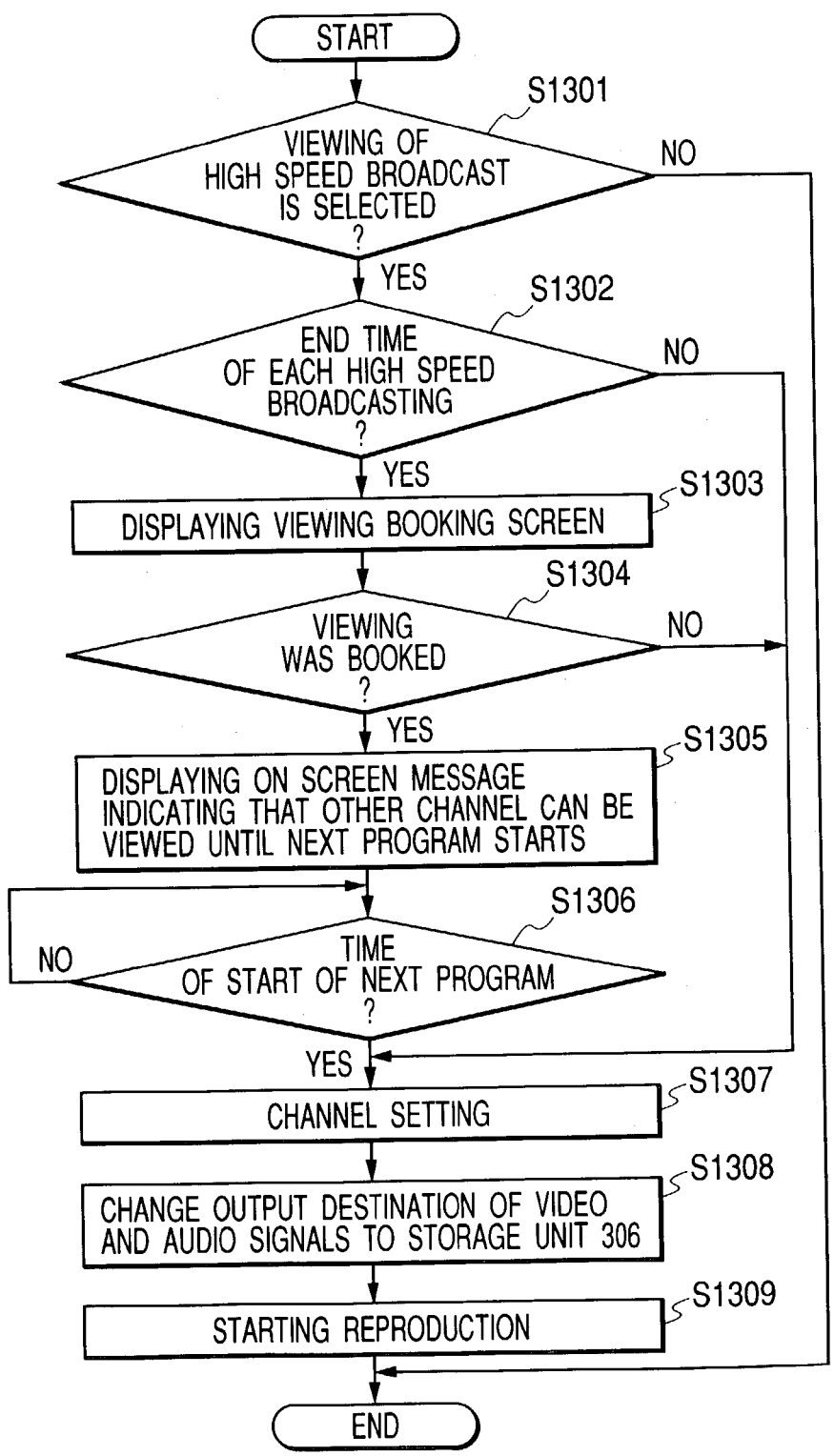

TELEVISION BROADCASTING SYSTEM

BACKGROUND OF THE INVENTION

1. Field of the Invention

The present invention relates to a television broadcasting system, and particularly to a system for storing a received television broadcast signal and reproducing it for viewing.

2. Related Background Art

In recent years, with the progress of digital technology, the conventional analog systems, NTSC, PAL, and SECAM systems are giving way to digital systems for a television broadcasting system. For example, the digitalized terrestrial broadcasts have already been started in the United States and Europe, and in Japan, the BS digital broadcasts were started on December in 2000 and the digitalized terrestrial broadcasts are scheduled to be started in 2003.

In addition, with the digitalization of the television broadcasts, the conventional analog video recorders are also giving way to digital video recorders regarding recorders at the receiving ends. Furthermore, there have been conventionally suggested methods, apparatuses, and systems using a hard disk, which has ever been used mainly as a storage unit for a computer, as a storage unit for recording television broadcast data.

For example, in Japanese Patent Application Laid-Open No. 7-264529, there has been disclosed a video recorder, which uses a random accessible semiconductor memory or disk instead of a recording medium performing sequential recording so as to be capable of special reproduction such as time shifting for starting to reproduce a recorded program at desired timing during recording television broadcast data of a certain program and delayed reproduction for quickly reproducing in a forward direction a recorded program from its beginning to a current recording position at a partway advanced stage of program recording.

The conventional television broadcast processor having this type of reproduction function, however, cannot reproduce a program at a pace exceeding the actual program broadcasting.

Therefore, for example, in case that a program of an auto race held on one day is broadcasted on that day for two hours from 11:30 at night, conventionally it is impossible to view the entire program in half an hour which receiving and recording television broadcast data of the program and quickly reproducing it in the forward direction.

Thus, conventionally the following users' demands are not satisfied due to limitations of program editing time or of programming plans: a demand for viewing a program broadcasted in late night hours or a program whose result only is desired to be known by a user and a demand for finishing viewing a program as soon as possible for any reason.

Furthermore, in the conventional television broadcast processor, a user cannot go back to the past to reproduce and view a program, in other words, to view a program which is now being broadcasted, from the beginning of the program at this time point.

Therefore, for example, in case that a user is going to view a program broadcasted for an hour from 10:00 to 11:00 but a quarter hour has already been elapsed from the beginning of the program broadcasting, it is impossible to meet a user's demand for viewing the entire program from the beginning.

SUMMARY OF THE INVENTION

Therefore it is an object of the present invention to resolve the foregoing problems.

It is another object of the present invention to enable a user to view a broadcast program in a desired form according to a user's situation.

It is still another object of the present invention to satisfy demands for viewing a program broadcasted in late night hours or a program whose result only is desired to be known by a user and for finishing viewing a program as soon as possible for any reason, caused due to limitations of program editing time or of programming plans.

It is still another object of the present invention to enable a user to view the entire program from the beginning thereof even if broadcasting of the program has already been started.

To achieve these objects, there is provided a receiving apparatus for receiving a television broadcast signal, comprising: receiving means for receiving a television broadcast signal including a predetermined program broadcasted at a speed higher than a normal transmission speed and an other program broadcasted at the normal transmission speed, detection means for detecting the predetermined program from the television broadcast signal received by the receiving means, a storage for storing the television broadcast signal received by the receiving means, reproduction means for reproducing the television broadcast signal stored in the storage, and control means for controlling the reproduction means in accordance with a detection result of the detection means to write the television broadcast signal of the predetermined program into the storage and reproduce the television broadcast signal of the predetermined program from the storage at a speed higher than the normal reproduction speed.

Other objects and features of the invention besides those discussed above shall be apparent from the following detailed description of the embodiments of the invention taken in conjunction with the accompanying drawings.

BRIEF DESCRIPTION OF THE DRAWINGS

FIG. 3 is a diagram showing various data IDs multiplexed with a television broadcast signal;

FIG. 4 is a diagram showing a condition of a network information table in the television broadcast signal;

FIG. 5 is a diagram showing a condition of a service list descriptor as a descriptor in the network information table;

FIG. 6 is a diagram showing a condition of a service form in the service list descriptor;

FIGS. 7A and 7B are diagrams showing a condition of EPG;

FIGS. 8A, 8B, 8C, 8D and 8E are diagrams showing a condition of a reproducing operation in the embodiment of the present invention;

FIGS. 9A and 9B are diagrams showing a detecting operation of a program transmitted at a high speed in the embodiment of the present invention;

FIGS. 10A and 10B are diagrams showing a condition of EPG;

FIGS. 11A, 11B and 11C are diagrams showing a condition of a reproducing operation of the embodiment of the present invention;

FIGS. 12A, 12B and 12C are diagrams showing a condition of a reproducing operation of the embodiment of the present invention;

FIG. 13 is a flowchart showing a receiving operation of a program transmitted at a high speed.

DETAILED DESCRIPTION OF THE PREFERRED EMBODIMENTS

The preferred embodiments of the present invention will now be described in detail hereinafter with reference to the accompanying drawings.

First Embodiment

Figure 1:
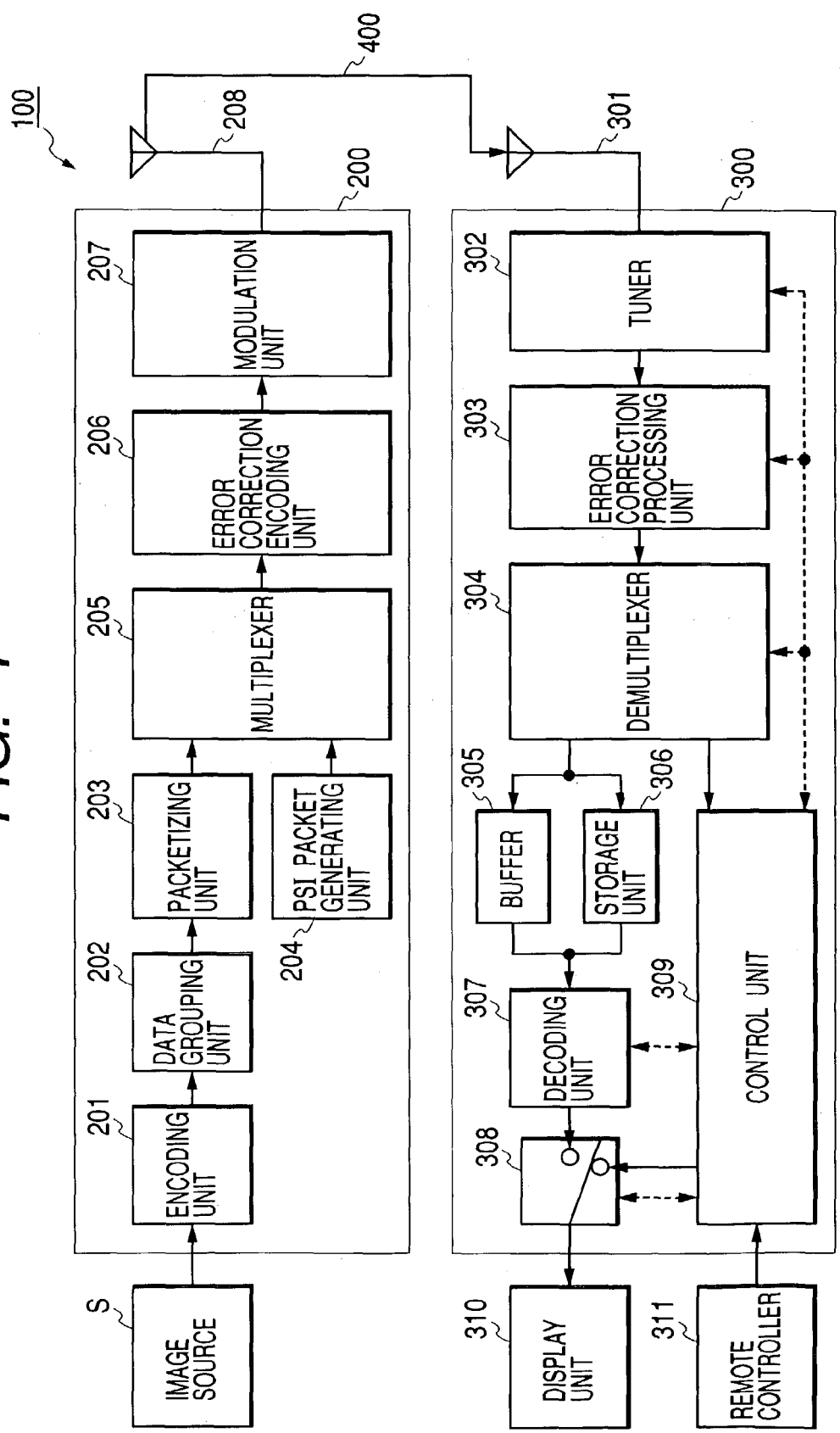
FIG. 1 is a diagram showing a configuration of a broadcast system to which the present invention is applied.
Figure 2:
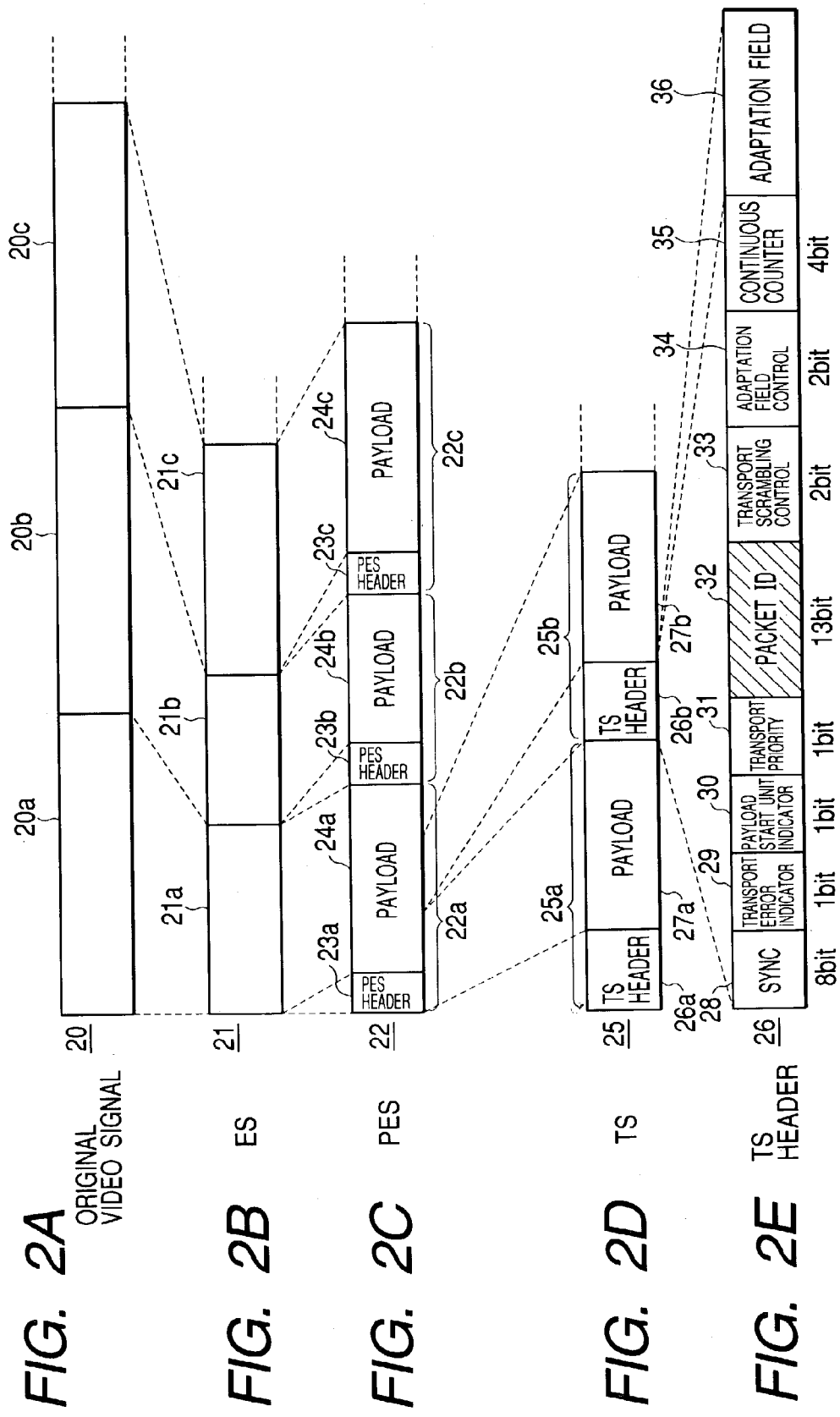
FIGS. 2A, 2B, 2C, 2D and 2E are diagrams showing a condition of a television broadcast signal treated in an embodiment of the present invention.

The present invention is applicable to a television broadcast transmitter-receiver system 100 as shown in FIG. 1, for example. In FIG. 1 in the above, a solid line indicates a data line and a broken line indicates a control line. Entire configuration of television broadcast transmitter-receiver system 100

The television broadcast transmitter-receiver system 100 comprises a transmitter 200 and a receiver 300 as shown in FIG. 1.

The transmitter 200 encodes a high definition (HD) broadcast signal and a standard definition (SD) broadcast signal to generate broadcast data strings at bit rates around 20 Mbps and 6 Mbps. It allocates 24 slots and 6 slots (1 slot is equivalent to a capacity of transmission of 1.08 Mbps) to bands of a transmission of the broadcast data strings to transmit them. In addition, the transmitter 200 transmits the television broadcast signal of a specific program including an image signal generated for the SD broadcast, at a speed N times, for example, 4 times rate by using an HD broadcast band.

Particularly, the transmitter 200 adds information capable of informing a user that a specific broadcast channel or program is reproducible quickly in the forward direction as described later (quick forward reproducible due to the high-speed transmission), to program specific information (PSI) multiplexed with a television broadcast signal, allocates slots of wider bands than the bit rates at the encoding to transmit the signal at a high speed.

On the other hand, the receiver 300 receives the television broadcast signal from the transmitter 200, determines whether the specific broadcast program included in the received television broadcast is quick forward reproducible on the basis of information obtained from its PSI, informs the user of the determination result, and reproduces data of the specific program at a high speed while storing it into a storage unit 306 when the user selects the specific program.

In other words, in this embodiment, the transmitter 200 adds the information indicating that the specific program is transmitted at a high speed, to the PSI corresponding to the specific program transmitted at a high speed to transmit the program.

The receiver 300 determines whether the selected program is transmitted at a high speed, on the basis of the PSI obtained by separating it from the television broadcast signal received from the transmitter 200 and stores data of the specific program into the random-accessible storage unit 306 such as a hard disk.

If the receiver 300 has received a normal television broadcast program, the program data is not stored into the storage unit 306, but stored once into a buffer 305 and decoded immediately thereafter to be output. When displaying an electronic program guide (EPG), it is arranged so that a user can distinguish the program transmitted at a high speed from the normal television broadcast programs.

With the foregoing configuration, the user can record the television broadcast program transmitted at a high speed from the transmitter 200 while viewing the program by reproducing it quickly in the forward direction. In addition, the data of the received television broadcast program is stored once into the storage unit 306, by which the user can reproduce the recorded program at the normal speed again after viewing the recorded program by quickly reproducing it in the forward direction.

Configuration and Operations of Transmitter 200

As shown in FIG. 1, the transmitter 200 has an encoding unit 201, a data grouping unit 202, a packetizing unit 203, a PSI packet generating unit 204, a multiplexer 205, an error correction encoding unit 206, a modulation unit 207, and an antenna 208.

In the transmitter 200, the encoding unit 201, the data grouping unit 202, and the packetizing unit 203 will be described first by referring to FIGS. 2A to 2E.

The encoding unit 201 performs compression coding complying with MPEG2 on a video signal output from an image source S and generates coded data with a bit rate of roughly 4 to 6 Mbps for the SD broadcast or roughly 18 to 24 Mbps for the HD broadcast, for example.

Specifically, it encodes an original video signal 20 comprising a plurality of frames 20a, 20b, and 20c or the like shown in FIG. 2A and generates a variable-length elementary stream (ES) 21 shown in FIG. 2A.

A coding method of audio data depends upon whether it is for use in the communication satellite (CS) digital broadcast or the broadcast satellite (BS) digital broadcast. In other words, audio data is encoded with the MPEG1 audio Layer 3 method (MP3) and converted to data of roughly 48 Kbps for use in the CS digital broadcast, while audio data is encoded with the advanced audio coding (AAC) method and converted to data of roughly 48 Kbps for use in the BS digital broadcast.

The data grouping unit 202 converts the ES 21 obtained by the encoding unit 201 to a variable-length packetized elementary stream (PES) 22 as shown in FIG. 2C.

In other words, the data grouping unit 202 adds a PES header 23 to each predetermined unit in the ES 22 to generate a PES packet. Thereafter, it generates a PES comprising a plurality of PES packets 22a, 22b, 22c, and after. Each PES packet includes the header 23 and a payload 24. The header 23 includes information indicating an attribute of a component such as a presentation time stamp (PTS).

As shown in FIG. 2D, the packetizing unit 203 converts the PES 22 obtained by the data grouping unit 202 to a transport stream (TS) 25 that is a transmission data string.

In other words, the packetizing unit 203 adds a TS header to each predetermined amount of PES to generate a plurality of TS packets of 188 bytes. Thereafter, it generates a TS comprising the plurality of TS packets 25a, 25b, 25c, and after. Each TS packet, which has a fixed-length of 188 bytes, comprises a TS header 26 of 4 bytes and a payload 27 that is PES data.

As shown in FIG. 2E, the header 26 comprises 8-bit synchronous data 28, a 1-bit transport error indicator 29, a 1-bit payload unit start indicator 30, a 1-bit transport priority 31, a 13-bit packet ID (PID) 32, a 2-bit transport scrambling control 33, a 2-bit adaptation field control 34, a 4-bit continuous counter 35, and a variable-length adaptation field 36.

In the TS header 26, the PID 32 has a 13-bit value for identifying data included in the TS packet and it is used for specifying a required packet in the TS 25.

The PSI packet generating unit 204 outputs a TS-packetized PSI as described below to the multiplexer 205.

The PSI is information on a program such as information for specifying a program included in the TS, where various tables as shown in FIG. 3 are defined as PSI data.

Since the PSI is described in detail in "ARIB (Association of Radio Industries and Businesses) STD-B10 Section II, Chapter 5", its detailed description is omitted here.

A PSI signal is arranged in a payload in the TS packet in accordance with a signal configuration referred to as a section, to be transmitted.

Among the tables defined in the PSI, a program map table (PMT) indicates a PID of the TS packet including video data and audio data of each program and a program association table (PAT) indicates a PID of the TS packet including the PMT.

A network information table (NIT) provides network information including a plurality of TSs and indicates data of various services and transmission lines provided in the entire network.

Referring to FIG. 4, there is shown an NIT data structure.

In FIG. 4, two descriptors exist for the NIT section. The descriptor with an underline in these descriptors is a service list descriptor, which provides a service list with a service ID and a type of service form.

Referring to FIG. 5, there is shown a structure of the service list descriptor.

The service ID in FIG. 5 uniquely identifies an information service in the TS and is equivalent to a broadcast program number in the corresponding PMT. Furthermore, the service type indicates a service type (a digital TV service, a data service, etc.) as shown in FIG. 6, for example.

In this embodiment, information is added to the PSI; the information indicates that a specific program is reproducible quickly in the forward direction. For example, a definition is made for a currently undefined part or a part defined by an enterprise as a new service defined in accordance with a service type in the NIT service list descriptor (for example, a digital TV service and a fast-forwardable service). Naturally, information indicating that the specific program is reproducible quickly in the forward direction may be added to another part of the PSI only if the receiver 300 recognizes its stored location.

For example, the information can be added to a program description of a rectangular event descriptor on an event information table (EIT) or to any other arbitrary part.

The multiplexer is supplied with the TS 25 generated as described above and the PSI obtained by the PSI packet generating unit 204. The multiplexer multiplexes PSI packets from the PSI packet generating unit 204 at a predetermined timing with the TS packets from the packetizing unit 203.

The error correction encoding unit 206 performs error correction encoding on the multiplexed data obtained by the multiplexer 205.

The modulation unit 207 modulates and amplifies the data processed by the error correction encoding unit 206 into a format suitable for a transmission line 400 via an antenna 208 and then sends it from the antenna 208 as television broadcast data.

Configuration and Operations of Receiver 300

As shown in FIG. 1, the receiver 300 comprises an antenna 301, a tuner 302, an error correction processing unit 303, a demultiplexer 304, a buffer 305, a storage unit 306, a decoding unit 307, a switch 308, a control unit 309, and a remote controller 311.

In the receiver 300, the antenna 301 receives a television broadcast transmitted from the transmitter 200.

The control unit 309 gets channel information (a frequency, TS_ID, etc.) to be received by the antenna 301 and controls the tuner 302 on the basis of this information to control switching of a receiving frequency at the antenna 301.

The tuner 302 demodulates data of a target channel in the stream received by the antenna 301. The error correction processing unit 303 corrects errors in output data of the tuner 302.

The demultiplexer 304 separates PSI data such as EIT or NIT from the data corrected by the error correction processing unit 303 and outputs it to the control unit 309.

The control unit 309 controls the demultiplexer 304 on the basis of the PSI data, determines whether the user-selected program is reproducible quickly in the forward direction, and outputs data from the demultiplexer 304 to one of the storage unit 306 and the buffer 305 with switching therebetween.

The control unit 309 receives various PSI sections specified by PIDs shown in FIG. 3 from the demultiplexer 304 to obtain information necessary for generating an EPG and information indicating a quickly-reproducible program of the present embodiment.

Therefore, when receiving a normal broadcast program, the demultiplexer 304 outputs video data and audio data of the program to the buffer 305. The decoding unit 307 decodes and outputs the data from the buffer 305.

On the other hand, when receiving a quickly-reproducible program of the present embodiment, the demultiplexer 304 outputs the video data and audio data of the program to the random-accessible storage unit 306 to store them therein. The decoding unit 307 reads out the data stored in the storage unit 306 at a desired speed to decode it in accordance with an instruction from the control unit 309.

In this embodiment, the decoding processing executed by the decoding unit 307 includes two types of decoding; one is executed at a normal speed and the other involves forward quick reproduction attained by executing decoding while thinning out frames of reproduced video data.

As the latter method of decoding processing with thinning out data, there is a method of decoding with an omission of decoding of B pictures included in the reproduced video data, for example, though any other arbitrary method is also applicable. If the quick-forward speed is further higher, P and I pictures, for example, may be omitted as well as the B pictures depending on the speed.

The control unit 309 controls switching of the decoding method executed by the decoding unit 307. The decoding unit 307 is considered to execute processing corresponding to the encoding used by the encoding unit 201 in the transmitter 200. Since the data of the program transmitted at a high speed from the transmitter 200 is stored once into the storage unit 306 in the receiver 300, the user can view the data stored in the storage unit 306 at the normal speed again after quick forward reproduction of the data, too.

Upon receiving an EPG display request via the remote controller 311 from the user, the control unit 309 generates an EPG screen on the basis of the PSI obtained from the demultiplexer 304 and switches the EPG screen to a screen generated according to the video signal obtained in the decoding unit 307 to display it on the display unit 310. In generating the EPG screen, the control unit 309 generates the EPG screen in such a form that a quick forward reproducible program can be identified from normal programs.

Upon receiving a program selection request, the control unit 309 provides the tuner 302 with information (a channel frequency, TS_ID, a video PID, an audio PID, or other information) necessary for receiving the program. In this operation, with an arrangement constructed so that a channel number and information necessary for receiving the channel concerned are listed as a table to be stored in advance and the system is configured so as to skip PAT and PMT reference processing, for example, the channel switching can be accelerated.

The control unit 309 determines whether the selected program is to be reproduced at a normal speed or it is quick forward reproducible, controls the demultiplexer 304 to output video data and audio data to the buffer 305 or the storage unit 306, and further controls the decoding unit 307 to execute the foregoing decoding processing.

In other words, when selecting a quick forward reproducible program, the control unit 309 decodes and outputs the data at the normal speed until a viewer issues a quick forward reproduction request, and decodes and outputs the data with thinning out it in the foregoing method upon receiving the quick forward reproduction request.

The following specifically describes a method of discriminating the normal program and the quick forward reproducible program, which method is executed in the control unit 309.

The control unit 309 discriminates the normal program and the quick forward reproducible program by checking the information added to the PSI by the PSI packet generating unit 204 in the transmitter 200 such as, for example, a service type in the NIT service list descriptor or information reflected on the program description in the EIT rectangular event descriptor.

In addition, the following describes a sample structure for identifying a quick forward reproducible program on the EPG screen and an example of a program plan therefor with reference to FIGS. 7A and 7B.

For example, assuming that channel 100 and channel 101 are for use in normal broadcasts and channel 102 is for a quick forward reproducible broadcast program, an identification mark 701 is first added to the channel 102 for the quick forward reproducible program as shown in FIG. 7A on the sample EPG screen shown in FIG. 7A.

If the single channel 102 contains both of the quick forward reproducible program and the normal program, for example, an identification mark 702 is added to the quick forward reproducible program "F1 Grand Prix Fifth Round" in the channel 102 as shown in FIG. 7B.

The arrangement for identifying the quick forward reproducible program on the EPG screen is not limited to adding the identification mark therefor, but it is also possible to use other arrangements such as, for example, an arrangement for displaying a dedicated icon image or outputting a beep sound to present a quick forward reproducible program to a user. For example, in the example of FIG. 7A, the channel 102 is a dedicated channel for a quick forward reproducible broadcast program and therefore all the programs on the channel are broadcasted as quick forward reproducible programs.

As has been described in the foregoing, in this embodiment, the transmitter sends data at a speed n times higher than the normal transmission speed using the high definition broadcast channel and the broadcast programs of the channel transmitted at the high speed are stored once and then reproduced at a user's desired speed, by which the user can view the television program on air at the high speed.

For example, as shown in FIGS. 8A and 8B, by accumulating signals for two-hour program transmitted at a high speed and reproducing them at a high speed with fast-forwarding them at a speed four times higher than normal from the beginning to the end, by which the user can view the program in half an hour. Furthermore, as shown in FIGS. 8C and 8D, by accumulating the signals for the two-hour program transmitted at the high speed and reproducing the first 10 min. and the last 10 min. of the signals at the normal speed and reproducing 100 min. of the signals between them at a speed four times higher than normal, the user can view the program in 25 min., or, as shown in FIG. 8C, the user can view the program in 10 min by reproducing 100 min. of the signals at a speed 10 times higher than normal.

Specifically, for example, the user can finish viewing the program broadcasted from 12:00 to 1:00 at night until 12:15 with quickly reproducing the program in the forward direction.

Second Embodiment

In the first embodiment, the transmitter 200 adds to the PSI information indicating that a specific program is quickly reproducible.

On the other hand, in this embodiment, the transmitter 200 does not add anything to the PSI, but the demultiplexer 304 in the receiver 300 discriminates that the program has been transmitted at a high speed on the basis of a speed at which user-selected program data is transmitted from the transmitter 200.

Hereinafter, only configurations and operations different from those in the first embodiment will be described specifically. Configuration and operations of transmitter 200

The transmitter 200 transmits television broadcast data of a specific program at a high speed with allocating slots of wider bands than bit rates of encoding.

Since the transmitter 200 in this embodiment is the same as in the first embodiment in the configuration and operations of the encoding unit 201, the data grouping unit 202, the packetizing unit 203, the multiplexer 205, the error correction encoding unit 206, the modulation unit 207, and the antenna 208, their detailed description will be omitted here.

The PSI packet generating unit 204 differs from one in the first embodiment; it generates the same PSI as the normal channel or program to packetize TS. The multiplexer 205 multiplexes the PSI data obtained by the PSI packet generating unit 204 and TS obtained by the packetizing unit 203.

Configuration and Operations of Receiver 300

The receiver 300 receives the television broadcast data transmitted from the transmitter 200, informs a user that the broadcast program is quick forward reproducible when the demultiplexer 304 recognizes that the data is transmitted at a high speed, on the basis of the speed at which the user-selected program data is transmitted, and reproduces the program data at a high speed while storing it into the storage unit 306.

If the receiver 300 receives a normal broadcast program, it does not store the program data into the storage unit 306, but stores it once into the buffer 305 and encodes and outputs it immediately.

Therefore, also in this embodiment, with displaying information for identifying the quick forward reproducible broadcast program on the screen, the user can view the broadcast program while quickly reproducing it in the forward direction. In addition, data of the broadcast program is stored once into the storage unit 306, by which the user can view the program again with normal speed reproduction after viewing with quick forward reproduction of it.

The following describes the receiver 300 in this embodiment specifically.

Since the receiver 300 in this embodiment is the same as in the first embodiment in the configuration and operations of the antenna 301, the tuner 302, and the error correction processing unit 303, their detailed description will be omitted here.

The demultiplexer 304 selects a TS packet header out of the data output from the error correction processing unit 303 and outputs it to the control unit 309 as well as PSI data. Thereafter, the demultiplexer 304 outputs data of the broadcast program to one of the storage unit 306 and the buffer 305 with switching therebetween on the basis of the result of the determination on whether the selected broadcast program can be quickly reproduced in the forward direction made by the control unit 309.

At this point, various PSI sections are extracted by the demultiplexer 304 and output to the control section 309, by which the control unit 309 obtains information necessary for generating the EPG.

For data of the normal broadcast program, the demultiplexer 304 outputs the data to the buffer 305 and the decoding unit 307 decodes it immediately to be output.

On the other hand, for data of the quick forward reproducible broadcast program of this embodiment, the data is output and stored into the storage unit 306. In this case, the decoding unit 307 follows the control of the control unit 309 to read out the data stored in the storage unit 306 at the user-specified speed and decodes the data.

The decoding processing executed by the decoding unit 307 includes decoding processing executed at the normal speed and decoding processing executed with thinning out the data to be decoded for quick forward reproduction. The method of the decoding processing executed with thinning out the data to be decoded is as described in the first embodiment.

The following describes one examples of the method of the discrimination processing executed by the control unit 309 on whether the selected broadcast program is quickly forward reproducible.

For example, the TS header shown in FIG. 2E has an adaptation field 36 at every head of the frames. If the TS header with the adaptation field 36 is input with higher frequency, in other words, if boundary of each frame appears at very short timing, it can be determined that the channel or program data is transmitted faster than normal.

In other words, the control unit 309 detects the TS header with the adaptation field 36 from the TS headers output from the demultiplexer 304 and determines whether the user-selected broadcast program is quick forward reproducible, on the basis of the detection result, in other words, a period at which an end of a frame appears.

Whether the program data forming the TS is of either HD or SD resolution, each transmission band (the number of slots) is adjusted and therefore there is no difference on the timing at which each frame boundary appears (in an order of N times) even if it is considered that a compressed code has a variable length depending on an image.

Specifically, the normal TS is shown in FIG. 9A and the TS transmitted at a high speed according to this embodiment is shown in FIG. 9B, for example.

First, in the normal TS as shown in FIG. 9A, if the TS header 901 has an adaptation field, the payload 902 following it is followed by a TS header 903 having no adaptation field and no TS header having an adaptation field appears until the TS header 904 of the TS packet including the first data of the next frame.

On the other hand, as shown in FIG. 9B, in the TS transmitted at the high speed according to this embodiment, a TS header 39 having the next adaptation field appears at a shorter period. For example, if the TS is transmitted at a speed (band) four times higher than normal, the period at which a TS header with an adaptation field arrives is also four times faster than normal, by which it is easy to determine that the TS is transmitted at a high speed.

As another determination method, there is a method of converting a TS to a PES, detecting an arrival speed (frequency) of a PES header having a constitutional unit length of a single frame, and determining whether the TS is transmitted at a high speed on the basis of the detection result.

Upon receiving an EPG display request via the remote controller 308 from a user, the control unit 309 generates an EPG screen on the basis of the PSI data obtained from the demultiplexer 304, switches the EPG screen to the screen generated in accordance with the video signal obtained in the decoding unit 307, and displays the screen on the display unit 310. In the EPG screen generation, the control unit 309 generates the EPG screen in such a form that a quick forward reproducible program according to the multiplexer 304 can be identified from normal broadcast programs.

Upon receiving a program selection request from a user, the control unit 309 provides the tuner 302 with information necessary for receiving the broadcast program.

The control unit 309 controls the demultiplexer 304 on the basis of a result of determination on whether the user-selected program is to be reproduced at a normal speed or quick forward reproducible, outputs the video data and the audio data to the buffer 305 or the storage unit 306, and further executes the foregoing decoding processing by controlling the decoding unit 307.

In other words, if the user selects a quick forward reproducible broadcast program, the control unit 309 decodes and outputs the data at the normal speed until a viewer issues a quick forward reproduction request and then upon receiving the quick forward reproduction request it decodes and outputs the data with thinning out it with the method as described in the first embodiment.

Third Embodiment

In the above embodiments, a single broadcast program is transmitted faster than normal, for example, the two-hour program "F1 Grand Prix Fifth Round" transmitted and broadcasted at the normal transmission speed on the channel 101 in FIGS. 7A and 7B is transmitted and broadcasted at a high speed for half an hour on channel 102, by which other three programs, "CART Third Round", "WRC Fourth Round", and "WGP Fifth Round" are transmitted and broadcasted at a high speed for an hour and a half, which is the remainder of the two hours.

In this embodiment, the different programs are not broadcasted in this manner, but the same program is transmitted repeatedly more than once at a high speed for two hours, which is the normal broadcast time length.

Note that, also in this embodiment, the television broadcast transmitter-receiver system 100, the structure of data to be treated, and the basic operations are the same as those in the first and second embodiments described with reference to FIGS. 1 to 6.

In other words, in this embodiment, the transmitter 200 transmits television broadcast signals of a specific program encoded for the SD broadcast at a high speed or at a speed N times, for example, four times higher than normal repeatedly or a predetermined number of times.

Thereafter, the transmitter 200 adds information indicating that the specific program is to be transmitted at a high speed repeatedly to a PSI combined with the television broadcast signal, allocates slots of wider bands than bit rates of encoding, and transmits the television broadcast signal repeatedly at a high speed.

On the other hand, the receiver 300 receives the television broadcast signal from the transmitter 200, determines whether the specific broadcast program included in the received television broadcast is to be transmitted repeatedly at a high speed, on the basis of the identification information added to the PSI, and displays the determination result. If a user selects the specific program, data of the program is reproduced at the normal speed while storing it into the storage unit 306.

Furthermore, in this embodiment, the modulation unit 207 has a storage unit storing broadcast data of a single program output from the error correction encoding unit 206 and data of the single broadcast program stored in the storage unit is transmitted repeatedly or a predetermined number of times.

In this embodiment, the data is transmitted four times faster than the normal broadcast speed and therefore, if the normal broadcast time is two hours, the two-hour program can be transmitted in half an hour. Accordingly, the same television broadcast program is transmitted repeatedly, or four times, at a high speed in this condition.

The receiver 300 determines whether the broadcast program is transmitted repeatedly at a high speed, on the basis of the PSI of the received television broadcast program in the same manner as in the above embodiment; when it is transmitted at a high speed, the data is stored in the storage unit 306. Thereafter, the stored program data is read out and decoded to be output at the normal speed.

In addition, in this embodiment, the same program is broadcasted at the normal transmission speed together with the foregoing.

Referring to FIGS. 10A and 10B, there are shown conditions of the EPG screen displayed by the receiver 300 receiving the television broadcast program broadcasted as described above.

In FIGS. 10A and 10B, channel 100 and channel 101 are those to which the television broadcast data is transmitted at the normal speed and channel 102 is for broadcasting in which the same program is transmitted repeatedly at a high speed, for example. First, in an example of the EPG screen shown in FIG. 10A, a given identification mark 1001 is added to the channel 102 to which the data is transmitted repeatedly at a high speed as shown in FIG. 10A.

In addition, when the single 102 channel includes a program transmitted repeatedly at a high speed and a program transmitted at the normal speed, for example, an identification mark 1002 is added to the program transmitted repeatedly at a high speed, "F1 Grand Prix Fifth Round" in the channel 102 as shown in FIG. 10B.

In this manner, according to this embodiment, in case that the target program is a one-hour program broadcast from 10:00 to 11:00 in the normal broadcast as shown in FIG. 11A, for example, the transmitter 200 transmits the program data four times at a speed four times higher than normal as shown in FIG. 11B. This enables the receiver 300 to receive data from the beginning of the program repeatedly, specifically four times, at intervals of a quarter hour from 10:00 when the program starts.

Therefore, as shown in FIG. 11C, if the user starts viewing the program 10 min. after the start of the program (10:10) in the receiver 300, for example, he or she starts viewing the program at the middle of the program transmitted currently at a high speed, in other words, the first broadcasting in FIG. 11B. This corresponds to the point after a lapse of about 40 minutes in one hour that is the original broadcast time. There-after, the user can view the entire program from the beginning thereof in an hour and a half by continuing viewing the program at the second high-speed transmission.

Fourth Embodiment

In the third embodiment, even if the time point when the user starts viewing does not correspond to an end of the repeatedly transmitted program, the user can view the entire program by starting to reproduce the program from that time point and continuing reproducing a program next transmitted at a high speed.

On the other hand, in this embodiment, if the time point when the user starts viewing does not correspond to an end of the repeatedly transmitted program, booking of viewing the next transmitted program is accepted and the program reception is automatically started at the next transmission start time, so that the user can view a program of any other channel until then.

Note that only configurations and operations different from those of the third embodiment will be described here specifically.

Configuration and Operations of Transmitter 200

Since the configuration and operations in this embodiment are same as in the first to third embodiments, their detailed description is omitted here.

Configuration and Operations of Receiver 300

Particularly when a user starts viewing a repeatedly transmitted program, the receiver 300 presents a function of accepting booking of viewing the next transmitted program and automatically switches a channel to the corresponding channel at a start of the next reception and thereafter stores data of the program into the storage unit 306 while reproducing it.

Since a configuration and operations of an antenna 301, a tuner 302, an error correction processing unit 303, a demultiplexer 304, and a decoding unit 307 in the receiver 300 are the same as in the first to third embodiments, their detailed description will be omitted here.

In the receiver 300, a control unit 309 generates an EPG screen on the basis of the PSI information obtained from the demultiplexer 304 upon receiving a display request of the EPG screen shown in FIGS. 10A and 10B from a remote controller 308, switches the EPG screen to a screen in accordance with video signals obtained from the decoding unit 307, and display it on a display unit 310.

In the EPG screen generation, the control unit 309 generates an EPG screen in such a form that a repeatedly transmitted program can be discriminated from normal programs as shown in FIGS. 10A and 10B when the repeatedly transmitted program is found on the basis of a result of determination of the repeatedly transmitted program described in the third embodiment.

Additionally, upon receiving a selection request for a program to be viewed, the control unit 309 supplies information necessary for receiving the corresponding channel to the tuner 302.

Furthermore, the control unit 309 determines whether the user-selected program is to be transmitted at a normal speed or to be transmitted repeatedly at a high speed, controls the demultiplexer 304 on the basis of the determination result to output video data and audio data to a buffer 305 or a storage unit 306, and further controls the decoding unit 307 to execute decoding processing.

The following describes acceptance processing of viewing booking requested from a user and reproduction processing therefor with reference to FIGS. 12A to 12C and FIG. 13.

Referring to FIG. 13, there is shown a flowchart of processing of the control unit 309 in this embodiment.

First, it is determined whether the user selects a program transmitted repeatedly at a high speed. When the user selects the program transmitted repeatedly at a high speed as a result of the determination, the control progresses to step S1302. Otherwise, the processing terminates (step S1301).

If the user selects the program transmitted repeatedly at a high speed as a result of the determination in step S1301, it is determined whether the selection time point corresponds to an end of the program transmitted repeatedly (step S1302).

Specifically, for example, if the target program is provided in a one-hour program broadcast from 10:00 to 11:00 in normal broadcasting as shown in FIG. 12A and the transmitter 200 transmits data of the program at a high speed or four times faster than normal as shown in FIG. 12B, the receiver 300 can receive data from the beginning of the program at intervals of a quarter hour from 10:00 that is the start time of the program.

In this condition, the control unit 309 determines whether the time when the user selected the channel or program transmitted repeatedly at a high speed is one of 10:00, 10:15, 10:30, and 10:45. If a viewing selection operation is performed at one of these time points as a result of the determination, the control progresses to step S1307. Otherwise, it progresses to step S1303.

Unless the time when the user selected the program transmitted repeatedly at a high speed corresponds to an end of the repeatedly transmitted program as a result of the determination in step S1302, the display unit 310 displays a screen to cause the user to select whether he or she books a next transmitted program for viewing (step S1303).

Subsequently, it is determined whether the user books the program for viewing (step S1304). If the user books it for viewing as a result of the determination, the control progresses to step S1305. Otherwise, it progresses to step S1307.

If the user books it as a result of the determination in step S1304, the display unit 310 displays a message indicating that he or she can view any other channel until the start of receiving the next transmitted program (step S1305).

As a result, if the user selects to for view the program at 10:10 as shown in FIG. 12C, he or she can view a program of any other channel until 10:15, which is the start time of the next program transmitted at a high speed.

Recognizing the start time of the next program after executing the control processing for enabling the user to view a program of any other channel until the start time of the next program, the control progresses to the next step S1307 (step S1306).

The control unit makes settings for channel switching on the tuner 302 so that it can receive data of the program booked by the user (step S1307) and controls the demultiplexer 304 to switch an output destination of the program data (video data and audio data) from the buffer 305 to the storage unit 306 (step S1308).

With this, the decoding unit 307 decodes and output the program data stored in the storage unit 306 (step S1309).

On the other hand, if the time when the user selects the repeatedly transmitted program corresponds to an end of the repeatedly transmitted program in the determination in step S1302, the control unit immediately makes settings of channel switching to the tuner 302 so that it can receive the program data (step S1307) and controls the demultiplexer 304 to switch an output destination of the program data from the buffer 305 to the storage unit 306 (step S1308).

With this, the decoding unit 307 decodes and outputs the program data stored in the storage unit 306 (step S1309).

Unless the user books the program for viewing in the determination processing in step S1304, the control unit immediately makes settings of channel switching to the tuner 302 so that it can receive data of the program (step S1307) and controls the demultiplexer 304 to switch the output destination of the program data from the buffer 305 to the storage unit 306 (step S1308) since reproduction is started even in the middle of the program.

With this, the decoding unit 307 decodes and outputs the program data stored in the storage unit 306 (step S1309).

According to this embodiment, even if the program broadcast has already been started at that time (10:10) as shown in FIGS. 12A to 12C for example, the user can view a program of any other channel for five min. until the next high-speed transmission starts by booking the program for viewing then and can view the entire program from the beginning in an hour and a quarter since the next program is started to be received at 10:15 and the program of other channel is changed to the booked program automatically. Furthermore, it is also possible to meet a demand for not wanting to view the last scene of the program before.

Fifth Embodiment

In this embodiment, viewing booking requested from a user can be accepted in the same manner as in the fourth embodiment, while PSI is not changed at all in the transmitter 200 in the same manner as in the second embodiment. The fifth embodiment differs from the fourth embodiment in this point.

Note that only configurations and operations different from those in the first to fourth embodiments will be described concretely here.

Configuration and Operations of Transmitter 200

This embodiment is the same as the third and fourth embodiments in the configuration and operations of the transmitter 200. Therefore, their detailed description will be omitted here.

Configuration and Operations of Receiver 300

The receiver 300 receives television broadcast data transmitted from the transmitter 200 and displays a message indicating that the program is to be transmitted repeatedly at a high speed when it is discriminated on the basis of the speed at which user-selected program data is transmitted from the demultiplexer 304 that the data is for high-speed repeated transmission. Furthermore, if a user selects a repeatedly transmitted program, the receiver presents a function of accepting viewing booking of the next transmitted program. Thereafter, the receiver automatically changes a channel to the corresponding channel at the start of receiving the next transmission and reproduces the program data while storing it into the storage unit 306.

Specifically, in the receiver 300, the control unit 309 generates an EPG screen on the basis of PSI information obtained from the demultiplexer 304 upon receiving a request for displaying the EPG screen from the user, switches the EPG screen to a screen complying with the video signals obtained in the decoding unit 307, and displays the screen on the display unit 310.

In addition, the control unit 309 provides the tuner 302 with information necessary for receiving data of the corresponding channel upon receiving a program selection request.

Furthermore, the control unit 309 determines whether the user-selected program is to be transmitted at a normal speed or to be transmitted repeatedly, outputs video data and audio data to the buffer 305 or the storage unit 306 by controlling the demultiplexer 304 on the basis of a result of the determination, and further executes decoding processing by controlling the decoding unit 307.

In this embodiment, when the user selects a program to be transmitted repeatedly at a high speed, the receiver accepts viewing booking for reproducing the selected program from the beginning in the same manner as in the fourth embodiment and the control unit 309 executes the processing as shown in FIG. 13.

In this embodiment, the effect described using FIGS. 12A to 12C can be achieved in the same manner as in the fourth embodiment.

The object of the present invention can also be achieved by providing a system or an apparatus with a storage medium storing a software program code for realizing the features of the host and terminals in the first to fifth embodiments and reading and executing the program code stored in the storage medium by means of a computer (or a CPU or MPU) in the system or the apparatus.

In this case, the program code itself read from the storage medium realizes the features of the first to fifth embodiments and therefore the present invention comprises the storage medium storing the program code and the program code. The storage medium for supplying the program code can be a ROM, a flexible disk, a hard disk, an optical disk, a magneto-optical disk, a CD-ROM, a CD-R, a magnetic tape, a non-volatile memory card, or the like.

The foregoing includes not only the case of achieving the features in the first to fifth embodiments by executing the program code read by the computer, but also a case of achieving the features in the first to fifth embodiments by a part or all of actual processing executed by an OS operating on the computer.

Furthermore, the foregoing includes a case of achieving the features in the first to fifth embodiments by a part or all of actual processing executed by a CPU in a feature expansion board inserted into a computer or in a feature expansion unit connected to the computer on the basis of an instruction of a program code read from the storage medium after the program code is written into a memory in the feature expansion board or the feature expansion unit.

Figure 14:
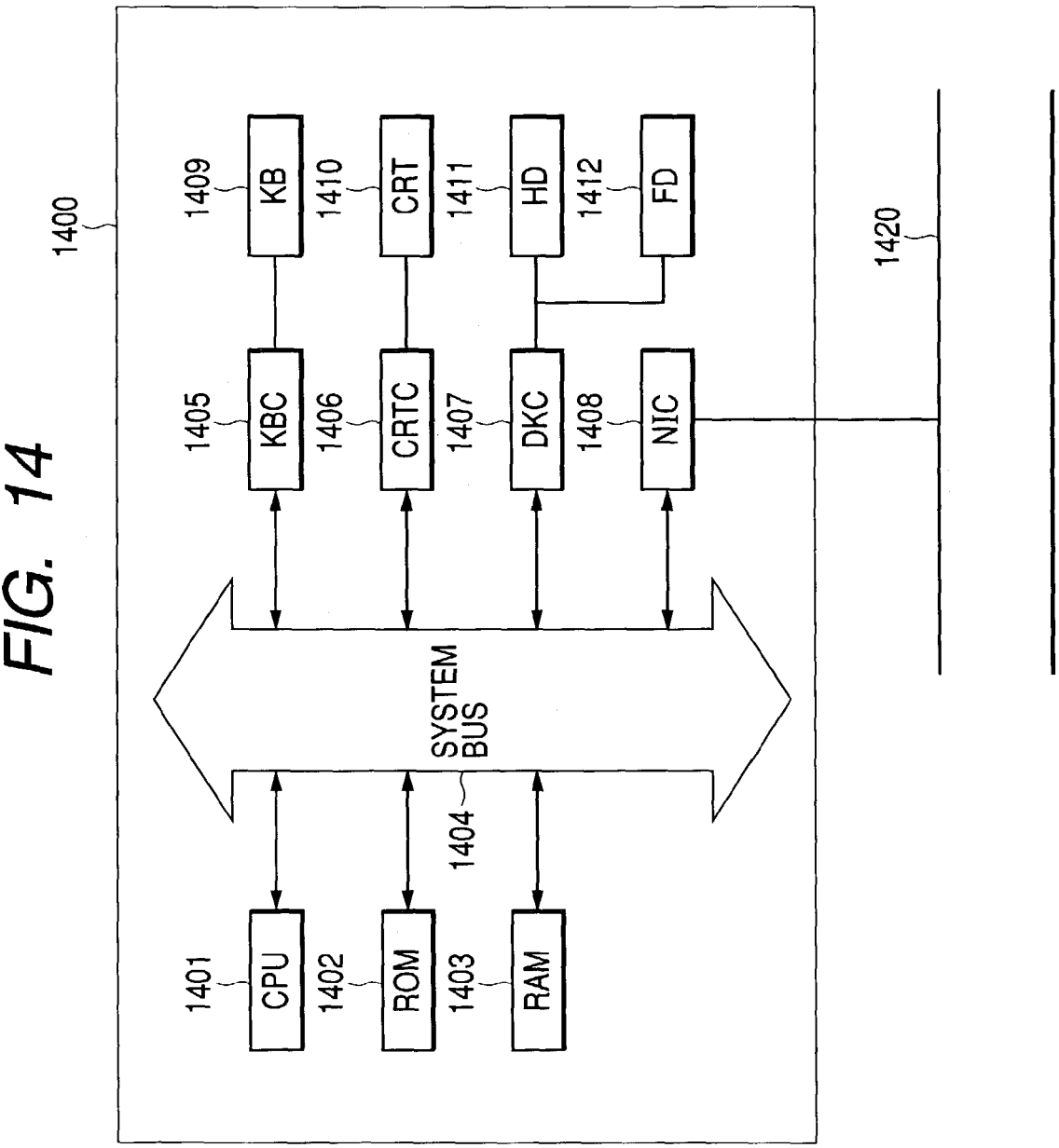
FIG. 14 is a diagram showing a computer feature to which the present invention is applied.

Referring to FIG. 14, there is shown the computer feature 1400.

As shown in FIG. 14, the computer feature 1400 comprises a CPU 1401, a ROM 1402, a RAM 1403, a keyboard controller (KBC) 1405 for a keyboard (KB) 1409, a CRT controller (CRTC) 1406 for a CRT display (CRT) 1410 as a display unit, a disk controller (DKC) 1407 for a hard disk (HD) 1411 and a flexible disk (FD) 1412, and a network interface controller (NIC) for a connection with a network 1420, which are communicatably connected with each other via a system bus 1404.

The CPU 1401 controls the component units connected to the system bus 1404 by executing software stored in the ROM 1402 or the HD 1411 or software supplied by the FD 1412 as a whole.

In other words, the CPU 1401 reads the processing program in a given processing sequence from the ROM 1402, the HD 1411, or the FD 1412 and executes the program to make controls to perform the operations in the first to fifth embodiments.

The RAM 1403 functions as a main memory, a work area, or the like for the CPU 1401. The KBC 1405 controls direction inputs from a KB 1409 or a pointing device which is not shown. The DKC 1407 controls accesses to a boot program, various applications, an editing file, a user file, a network management program, and the HD 1411 or the FD 1412 for storing a given processing program in the first to fifth embodiments. The NIC 1408 exchanges data with a device or a system on the network 1420 bidirectionally.

Many widely different embodiments of the present invention may be constructed without departing from the spirit and scope of the present invention. It should be understood that the present invention is not limited to the specific embodiments described in the specification, except as defined in the appended claims.

What is claimed is:

1. A receiving apparatus for receiving a television broadcast signal, comprising:
   receiving means for receiving a television broadcast signal including (a) a first program signal which is broadcasted at a transmission speed higher than a normal transmission speed for transmitting a program in a time period corresponding to a broadcasting time period thereof and (b) a second program signal which is broadcasted at the normal transmission speed to complete transmission of the second program signal in the time period corresponding to the broadcasting time period thereof, wherein the first program signal and the second program signal are the same content and are broadcasted respectively in broadcasting time periods overlapping with each other;
   detection means for detecting the first program signal from the television broadcast signal received by said receiving means;
   a storage for storing the first program signal detected by said detection means; and
   reproduction means for reproducing the first program signal stored by said storage,
   wherein said detection means detects information which is included in program service information (PSI) multiplexed in the television broadcast signal to indicate that the program signal is quick forward reproducible.

2. A receiving method of receiving a television broadcast signal, comprising the steps of:
   receiving a television broadcast signal including (a) a first program signal which is broadcasted at a transmission speed higher than a normal transmission speed for transmitting a program in a time period corresponding to a broadcasting time period thereof and (b) a second program signal which is broadcasted at the normal transmission speed to complete transmission of the second program signal in the time period corresponding to the broadcasting time period thereof, wherein the first program signal and the second program signal are the same content and are broadcasted respectively in broadcasting time periods overlapping with each other;
   detecting the first program signal from the television broadcast signal received in said receiving step;
   storing the first program signal detected in said detecting step in a storage; and
   reproducing the first program signal stored in said storing step from the storage,
   wherein said detecting step includes detecting information which is included in program service information (PSI) multiplexed in the television broadcast signal to indicate that the program signal is quick forward reproducible.

* * * * *